United States Patent
Hashimoto

(10) Patent No.: US 7,356,699 B2
(45) Date of Patent: Apr. 8, 2008

(54) ELECTRONIC WATERMARK DETECTION DEVICE AND ELECTRONIC WATERMARK DETECTION METHOD

(75) Inventor: Masahiro Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1078 days.

(21) Appl. No.: 09/982,579

(22) Filed: Oct. 18, 2001

(65) Prior Publication Data

US 2002/0053026 A1 May 2, 2002

(30) Foreign Application Priority Data

Oct. 18, 2000 (JP) ............................. 2000-317268

(51) Int. Cl.
*H04L 9/00* (2006.01)
(52) U.S. Cl. ..................... 713/176; 713/168; 713/178
(58) Field of Classification Search ................ 713/176, 713/168, 178
See application file for complete search history.

(56) References Cited

FOREIGN PATENT DOCUMENTS

| JP | 05-075892 | 3/1993 |
| JP | H9-91869 | 4/1997 |
| JP | 11-027508 | 1/1999 |
| JP | 11-341452 | 12/1999 |

OTHER PUBLICATIONS

Robust optimum detection of transform domain multiplicative watermarks Qiang Cheng; Huang, T.S.; Signal Processing, IEEE Transactions on [see also Acoustics, Speech, and Signal Processing, IEEE Transactions on] vol. 51, Issue 4, Apr. 2003 pp. 906-924.*
A Constructive and Unifying Framework for Zero-Bit Watermarking Furon, T.; Information Forensics and Security, IEEE Transactions on vol. 2, Issue 2, Jun. 2007 pp. 149-163.*
A dual watermark-fingerprint system Kirovski, D.; Malvar, H.; Yacobi, Y.; Multimedia, IEEE vol. 11, Issue 3, Jul.-Sep. 2004 pp. 59-73.*

* cited by examiner

*Primary Examiner*—David Jung
(74) *Attorney, Agent, or Firm*—Scully, Scott, Murphy & Presser, P.C.

(57) ABSTRACT

In the electronic watermark detection device, an electronic watermark detection unit receives input of a DCT coefficient and a picture start from a preprocessing unit to detect an electronic watermark inserted into image data and indicative of copyright information or the like, a detection result adjustment unit receives input of a picture start from the preprocessing unit and input of a detector result and a detector interruption from the electronic watermark detection unit to count the number of pictures, as well as generating and outputting a detection interruption according to the detection result, and an interruption processing unit receives input of a detection result and a detection interruption from the detection result adjustment unit to generate an interruption signal according to a system, as well as outputting the detection result.

30 Claims, 12 Drawing Sheets

FIG. 3

| | | | | | | | |
|---|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

HORIZONTAL SPACE FREQUENCY fH →

VERTICAL SPACE FREQUENCY fV ↓

ELECTRONIC WATERMARK DETECTION DEVICE AND ELECTRONIC WATERMARK DETECTION METHOD

BACKGROUND OF THE INVENTION

1. Field of the Invention

The present invention relates to an electronic watermark detection device and an electronic watermark detection method and, more particularly, to a method of detecting an electronic watermark inserted into digital images of the MPEG (Moving Picture Experts Group) standard and the like.

2. Description of the Related Art

In recent years, a wide spread of digital satellite broadcasting, Internet distribution, DVD (Digital Versatile Disk) and the like makes digital images be easily delivered to users. Since digital images involve no deterioration of image quality even when copied, protection of their copyright is a crucial issue.

Proposed as a means for realizing protection of copyright of digital images is a technique of adding copyright information etc. at a DCT (Discrete Cosine Transform) coefficient region of a digital image.

Such a device for detecting information in a DCT coefficient is structured as shown in FIG. 12. With reference to FIG. 12, an electronic watermark detection unit 32 receives input of a DCT coefficient and a picture start from a preprocessing unit 31 to detect an electronic watermark inserted into image data (MPEG stream) and outputs a result of the detection and a detection interruption for notifying the result.

Once starting detection of an electronic watermark, the electronic watermark detection unit 32 detects electronic watermarks at constant intervals unless an instruction to stop the detection is given. An interruption processing unit 33 receives input of the detection result and the detection interruption from the electronic watermark detection unit 32 to generate an interruption signal according to a system, as well as outputting the detection result.

In the above-described conventional electronic watermark detection device, since an electronic watermark detection interval is constant and fixed, even with an image whose detection intensity is low, images can be detected only at constant intervals to increase a system load and conversely, with an image whose detection intensity is high, images can be detected only at fixed intervals to delay system control response.

SUMMARY OF THE INVENTION

An object of the present invention is to solve the above-described problems and provide an electronic watermark detection device and an electronic watermark detection method which enable reduction of a system load without involving delays in system control response at the time of detection of an electronic watermark.

According to the first aspect of the invention, an electronic watermark detection device having an electronic watermark detection means for detecting an electronic watermark inserted into an image signal and indicative of at least copyright information, comprises detection result adjustment means for adjusting a detection interval of the electronic watermark based on a detection result of the electronic watermark detection means.

In the preferred construction, the electronic watermark detection means generates a detection result of the electronic watermark and a detection interruption for notifying the result, and the detection result adjustment means accumulates the detection results of the electronic watermark based on the detection result and the detection interruption from the electronic watermark detection means and adjusts the electronic watermark detection interval based on the accumulation result.

In another preferred construction, the detection result adjustment means adjusts output timing of the detection interruption based on the detection result and the detection interruption from the electronic watermark detection means to output the adjusted timing as an adjusted detection interruption.

In another preferred construction, the detection result adjustment means adjusts output timing of the detection interruption based on the detection result and the detection interruption from the electronic watermark detection means and externally instructed detection interval set value and set value of the number of detections to output the adjusted timing as an adjusted detection interruption.

In another preferred construction, the detection result adjustment means increases the detection interval when the electronic watermark is detected and decreases the detection interval when none of the electronic watermark is detected.

In another preferred construction, the electronic watermark detection means generates a detection result of the electronic watermark and a detection interruption for notifying the result, and the detection result adjustment means accumulates the detection results of the electronic watermark based on the detection result and the detection interruption from the electronic watermark detection means and adjusts the electronic watermark detection interval based on the accumulation result, and increases the detection interval when the electronic watermark is detected and decreases the detection interval when none of the electronic watermark is detected.

In another preferred construction, the detection result adjustment means adjusts output timing of the detection interruption based on the detection result and the detection interruption from the electronic watermark detection means to output the adjusted timing as an adjusted detection interruption, and increases the detection interval when the electronic watermark is detected and decreases the detection interval when none of the electronic watermark is detected.

In another preferred construction, the detection result adjustment means adjusts output timing of the detection interruption based on the detection result and the detection interruption from the electronic watermark detection means and externally instructed detection interval set value and set value of the number of detections to output the adjusted timing as an adjusted detection interruption, and increases the detection interval when the electronic watermark is detected and decreases the detection interval when none of the electronic watermark is detected.

In another preferred construction, the image signal is a digital image including at least an image of the MEPG (Moving Picture Experts Group) standard.

In another preferred construction, the image signal is a picture signal of at least a space region.

According to the second aspect of the invention, an electronic watermark detection method of an electronic watermark detection device for detecting an electronic watermark inserted into an image signal and indicative of at least copyright information, comprising the steps of detecting the electronic watermark, and adjusting a detection interval of the electronic watermark based on a detection result of the electronic watermark.

In the preferred construction, at the electronic watermark detection step, a detection result of the electronic watermark and a detection interruption for notifying the result are generated, and at the detection result adjustment step, the detection results of the electronic watermark are accumulated based on the detection result and the detection interruption from the electronic watermark detection step and the electronic watermark detection interval is adjusted based on the accumulation result.

In another preferred construction, wherein at the detection result adjustment step, output timing of the detection interruption is adjusted based on the detection result and the detection interruption from the electronic watermark detection step to output the adjusted timing as an adjusted detection interruption.

In another preferred construction, at the detection result adjustment step, output timing of the detection interruption is adjusted based on the detection result and the detection interruption from the electronic watermark detection step and externally instructed detection interval set value and set value of the number of detections to output the adjusted timing as an adjusted detection interruption.

In another preferred construction, at the detection result adjustment step, the detection interval is increased when the electronic watermark is detected and the detection interval is decreased when none of the electronic watermark is detected.

In another preferred construction, at the electronic watermark detection step, a detection result of the electronic watermark and a detection interruption for notifying the result are generated, and at the detection result adjustment step, the detection results of the electronic watermark are accumulated based on the detection result and the detection interruption from the electronic watermark detection step and the electronic watermark detection interval is adjusted based on the accumulation result, and the detection interval is increased when the electronic watermark is detected and the detection interval is decreased when none of the electronic watermark is detected.

In another preferred construction, at the detection result adjustment step, output timing of the detection interruption is adjusted based on the detection result and the detection interruption from the electronic watermark detection step to output the adjusted timing as an adjusted detection interruption, and the detection interval is increased when the electronic watermark is detected and the detection interval is decreased when none of the electronic watermark is detected.

In another preferred construction, at the detection result adjustment step, output timing of the detection interruption is adjusted based on the detection result and the detection interruption from the electronic watermark detection step and externally instructed detection interval set value and set value of the number of detections to output the adjusted timing as an adjusted detection interruption, and the detection interval is increased when the electronic watermark is detected and the detection interval is decreased when none of the electronic watermark is detected.

According to another aspect of the invention, an electronic watermark detection device having an electronic watermark detection unit which detects an electronic watermark inserted into an image signal and indicative of at least copyright information, comprises detection result adjustment unit which adjusts detection interval of the electronic watermark based on a detection result of the electronic watermark detection unit.

More specifically, at an electronic watermark detection device according to the present invention, an electronic watermark detection unit receives input of a DCT (Discrete Cosine Transform) coefficient (value obtained by multiplying a level, a value of a quantization table and a quantization scale) and a picture start (timing signal generated from a picture start code) from a preprocessing unit to detect an electronic watermark inserted into image data.

A detection result adjustment unit receives input of the picture start from the preprocessing unit and a detector result and a detector interruption from the electronic watermark detection unit to count the number of pictures, as well as generating and outputting a detection interruption according to the detection result. An interruption processing unit receives input of the adjusted detection result and the adjusted detection interruption from the detection result adjustment unit to generate an interruption signal according to a system, as well as outputting the detection result.

By thus providing a means for adjusting a detection interval at the detection of data into which an electronic watermark is inserted, thereby adjusting an electronic watermark detection interval at the time of detection of electronic watermarks, a system load can be reduced without delaying control response of the system.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing the order of scanning by zigzag scan of quantized DCT coefficients;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
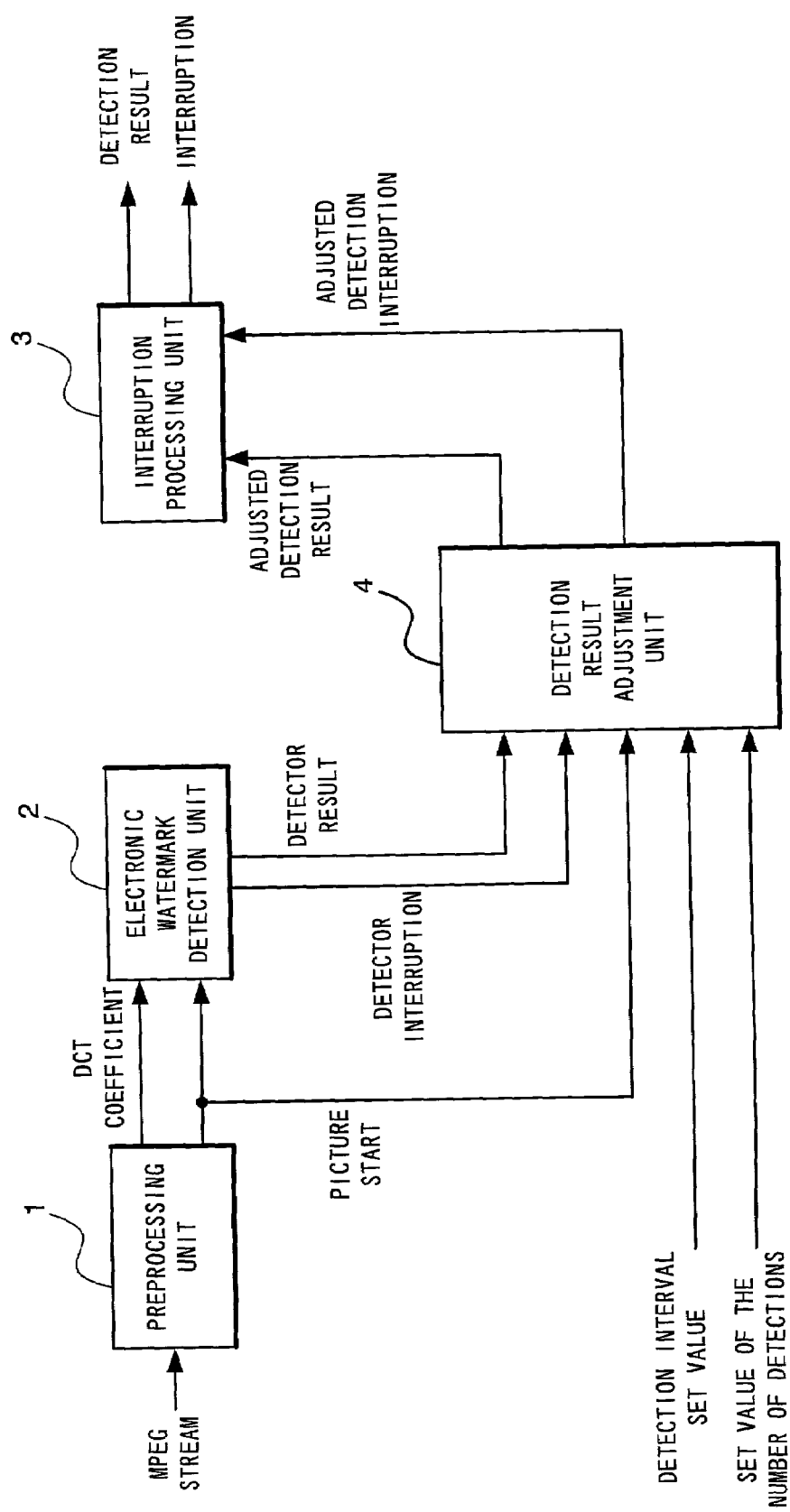
FIG. 1 is a block diagram showing a structure of an electronic watermark detection device according to one embodiment of the present invention.

FIG. 1 is a block diagram showing a structure of an electronic watermark detection device according to one embodiment of the present invention. In FIG. 1, the electronic watermark detection device according to one embodiment of the present invention includes a preprocessing unit 1, an electronic watermark detection unit 2, an interruption processing unit 3 and a detection result adjustment unit 4.

The electronic watermark detection unit 2 receives input of a DCT coefficient and a picture start from the preprocessing unit 1 to detect an electronic watermark inserted into image data and indicative of copyright information or the like and outputs the detection result and a detection interruption for notifying the result. The detection result adjustment unit 4 receives input of the picture start from the preprocessing unit 1 and input of a detector result and a detector interruption from the electronic watermark detection unit 2 to count the number of pictures, as well as generating and outputting a detection interruption according to the detection result. The interruption processing unit 3 receives input of the detection result and the detection interruption from the detection result adjustment unit 4 to generate an interruption signal according to a system, as well as outputting the detection result.

Figure 2:
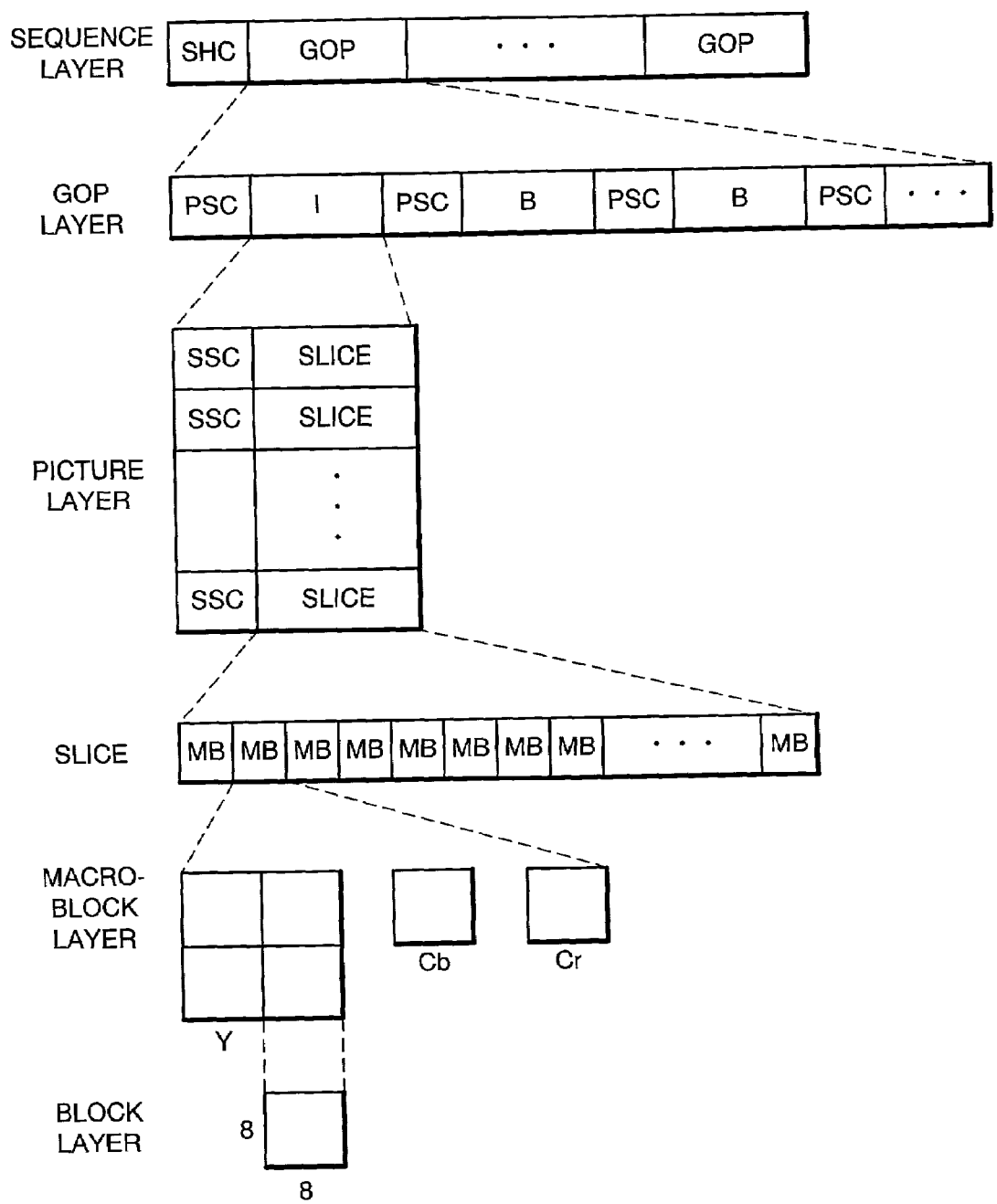
FIG. 2 is a diagram showing an arrangement of image data of an MPEG standard coding system.

FIG. 2 is a diagram showing an arrangement of image data of the MPEG (Moving Picture Experts Group) standard coding system. In FIG. 2, information of each frame or field of an image is described in and below a picture layer following a picture start code (PSC). Each frame or field information is coded in three kinds of picture formats, intra-picture (hereinafter, referred to as I picture), predictive picture (hereinafter, referred to as P picture) and bidirectionally-predictive-picture (hereinafter, referred to as B picture).

P picture and B picture use other image apart therefrom in time as a reference image and only a value of a difference from the image is coded as image information. In addition, pictures are subdivided into blocks and subjected to DCT (Discrete Cosine Transform) on a block basis, quantized by an appropriate quantization coefficient and subjected to Huffman coding.

The above-described preprocessing unit 1 generates a pulse signal for each picture start code in an MPEG stream and outputs the pulse signal as a picture start to the electronic watermark detection unit 2 and the detection result adjustment unit 4.

Field information of each frame exists in a macro-block (MB) layer below a slice layer following a slice start code (SSC) and when a color difference format is 4:2:0, the information is expressed by a total of six blocks including four block layers indicative of luminance information Y and two block layers indicative of color difference information Cb and Cr.

FIG. 3 is a diagram showing the order of scanning by zigzag scan of quantized DCT coefficients. With reference to FIG. 3, description will be made of variable-length coding of image data of an MPEG standard coding system by using Huffman codes.

In a case of zigzag scan, the quantized DCT coefficients are scanned in such a numerical order as shown in FIG. 3 and converted into 64 one-dimensional series. The position of "1" in FIG. 3 indicates a direct current (DC) component of a DCT conversion region and as the position moves rightward from thereon, a horizontal DCT conversion region becomes a high region and as it moves downward, a vertical DCT conversion region becomes a high region. Therefore, at first, scan starts at the position of "1" on the upper left corner to go through "2", "3", . . . "64", that is, scan is conducted in zigzag manner from a low region of a DCT conversion region slantwise toward a high region.

For the 64 one-dimensional series, non-zero coefficient amplitude (hereinafter, referred to as level) of DCT coefficients excluding a DC component (first component of one-dimensional series) and a length of a preceding succession of zero coefficients (hereinafter, referred to as run) are sequentially combined. For the combinations of the runs and levels, values in a table of quantization coefficients called a quantization table are unitarily determined.

In ordinary MPEG decoding, with respect to a value (hereinafter referred to as DCT coefficient) obtained by multiplying a level, a value of a quantization table and a quantization scale, a value subjected to inverse discrete cosine transform is turned into picture. The above-described preprocessing unit 1 generates a DCT coefficient and outputs the same to the electronic watermark detection unit 2.

Figure 4:
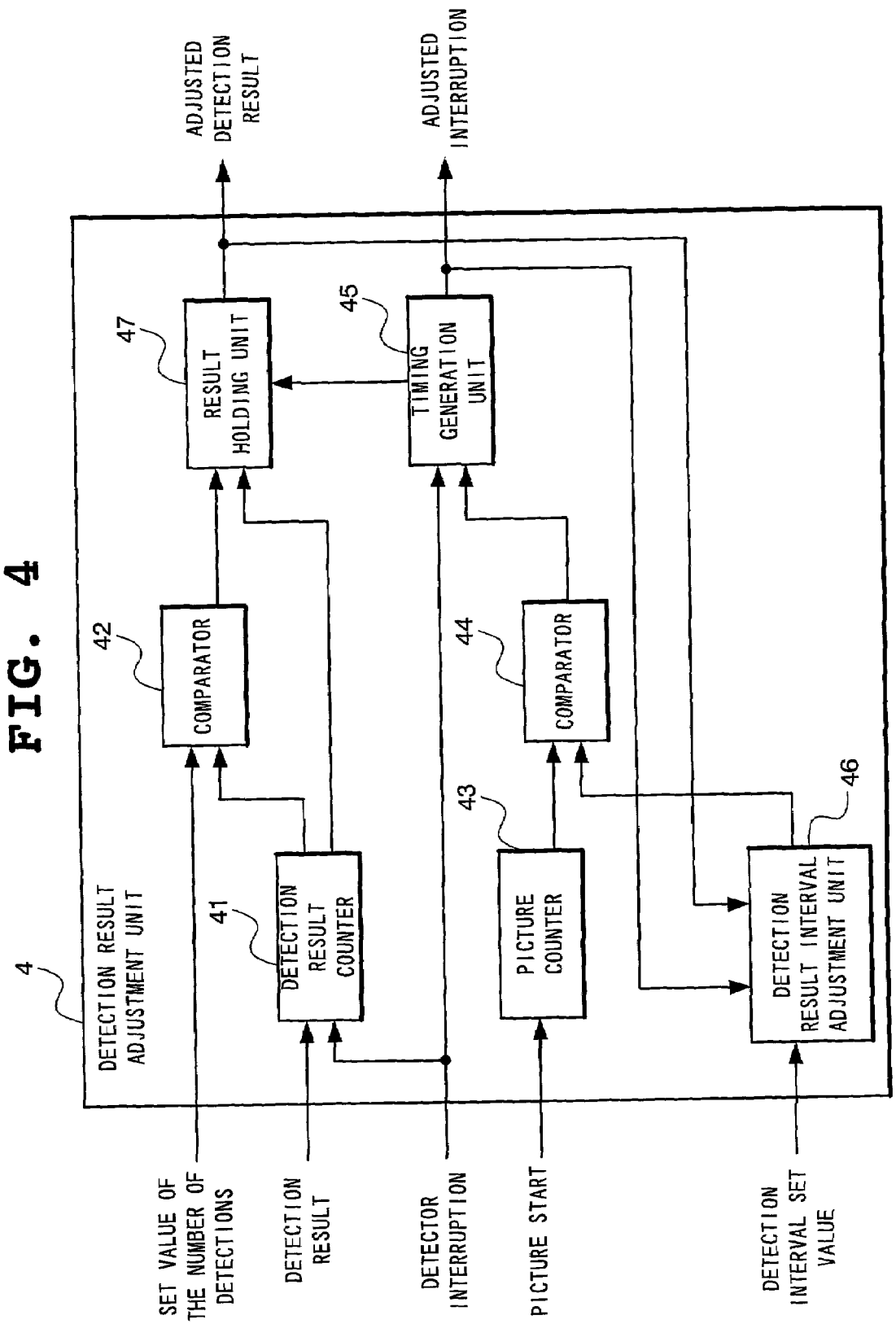
FIG. 4 is a block diagram showing a structure of a detection result adjustment unit illustrated in FIG. 1.

FIG. 4 is a block diagram showing a structure of the detection result adjustment unit 4 illustrated in FIG. 1. In FIG. 4, the detection result adjustment unit 4 includes a detection result counter 41, comparators 42 and 44, a picture counter 43, a timing generation unit 45, a detection result interval adjustment unit 46 and a result holding unit 47.

The detection result counter 41 receives input of a detector result and a detector interruption from the electronic watermark detection unit 2 to count the number of periods when the detector interruption is active while the detector result indicates "detection". The comparator 42 compares a value of the detection result counter 41 and a set value of the number of detections and when the value of the detection result counter 41 is not less than the set value of the number of detections, outputs the result indicative of "detection" to the result holding unit 47.

The picture counter 43 receives input of a picture start from the preprocessing unit 1 to count the number of pictures. The comparator 44 compares a value of the picture counter 43 and an adjusted interval value (output value of the detection result interval adjustment unit 46) and while the two values coincide with each other, outputs a signal indicative of "coincidence". After taking a logical sum of the signal indicative of "coincidence" from the comparator 44 and the detector interruption, the timing generation unit 45 outputs the sum with a delay of one clock as a holding trigger signal to the result holding unit 47 and outputs the same with a delay of two clocks as an adjusted interruption.

The detection result interval adjustment unit 46 receives input of the adjusted detection result, the adjusted interruption and a detection interval set value to operate and output a detection interval value based on the adjusted detection result. The result holding unit 47 holds the result of the comparator 42 and the output of the detection result counter 41 in response to the holding trigger signal from the timing generation unit 45.

Figure 5:
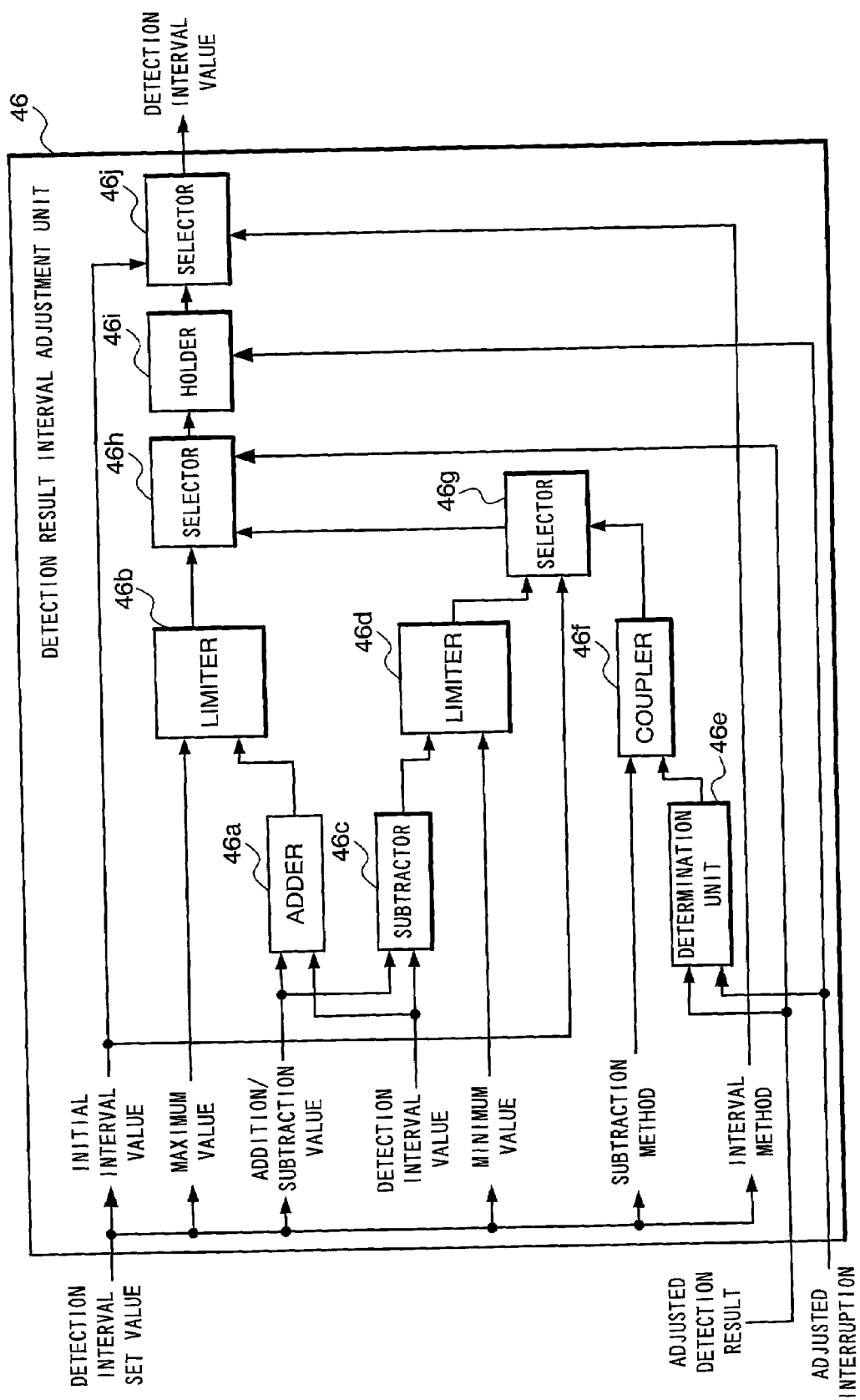
FIG. 5 is a block diagram showing a structure of a detection result interval adjustment unit illustrated in FIG. 4.

FIG. 5 is a block diagram showing a structure of the detection result interval adjustment unit 46 illustrated in FIG. 4. In FIG. 5, the detection result interval adjustment unit 46 includes an adder 46a, limiters 46b and 46d, a subtractor 46c, a determination unit 46e, a coupler 46f, selectors 46g, 46h and 46j and a holder 46i.

In FIG. 5, detection interval set values are classified into signals of an initial interval value, a maximum value, an addition/subtraction value, a minimum value, a subtraction method and an interval method. In other words, the detection interval set value is a combination of these values as one.

The adder 46a adds a detection interval value and an addition/subtraction value and the limiter 46b compares an output of the adder 46a and a maximum value and when the output of the adder 46a is not larger than the maximum value, outputs the output of the adder 46a and when the same is larger, outputs the maximum value.

The subtractor 46c subtracts the addition/subtraction value from the detection interval value and the limiter 46d compares an output of the subtractor 46c and a minimum value and when the output of the subtractor 46c is not smaller than the minimum value, outputs the output of the subtractor 46c and when the same is smaller, outputs the minimum value.

The determination unit 46e determines a change point from/to "detection" to/from "non-detection" based on an adjusted detection result obtained at each adjusted interruption. The coupler 46f generates a selection signal to be applied to the selector 46g according to a determination result of the determination unit 46e and setting of the subtraction method. The selector 46g outputs a result of the limiter 46d or an initial interval value according to an output of the coupler 46f.

When the adjusted detection result indicates "non-detection", the selector 46h selects the output of the limiter 46b to increase a subsequent interval value and when the result indicates "detection", selects the output of the selector 46g to decrease the subsequent interval value. The holder 46i holds an output of the selector 46h according to the timing of the adjusted interruption input. The selector 46j outputs the initial interval value or a value held in the holder 46j as a detection interval value according to an interval method. Depending on setting of the interval method, the initial interval value can be used as a detection interval value.

Figure 6:
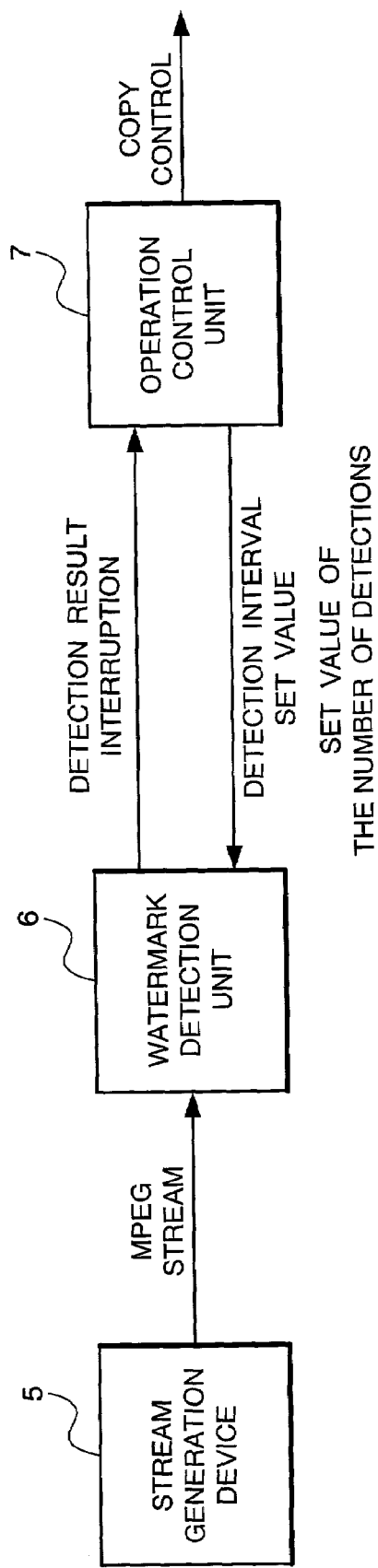
FIG. 6 is a diagram showing a relation between the electronic watermark detection device according to one embodiment of the present invention and its peripheral blocks.

FIG. 6 is a diagram showing a relation between the electronic watermark detection device (watermark detection unit) according to one embodiment of the present invention and peripheral blocks. In FIG. 6, although a stream generation device 5 has its internal structure not illustrated, it includes, for example, a device for reading a disk medium of a DVD and such a conversion circuit as a tuner for receiving satellite broadcasting to generate an MPEG stream.

A watermark detection unit 6, as shown in FIG. 1, receives input of an MEPG stream to output a detection result and an interruption according to a detection interval set value and a set value of the number of detections. An operation control unit 7, which contains general-purpose input/output operation processing such as a microcomputer, refers to a detection result in response to an applied interruption to conduct copy control.

Although the detection interval set value and the set value of the number of detections are illustrated as a signal, they can be input to the watermark detection unit 6 through a general-purpose input/output, for example, each of chip select•write enable•write data•write address signals. In this case, in the watermark detection unit 6, such a block as a register for interfacing the above-described signal group to generate a fixed signal should be provided at the preceding stage of the detection result adjustment unit 4 of FIG. 1.

In addition, although the detection result is also illustrated as a signal, it may be read by a register in response to a general-purpose input/output. In this case, such a block for generating a fixed signal as a register should be provided at a succeeding stage of the interruption processing unit 3 of FIG. 1 as described above.

Figure 7:
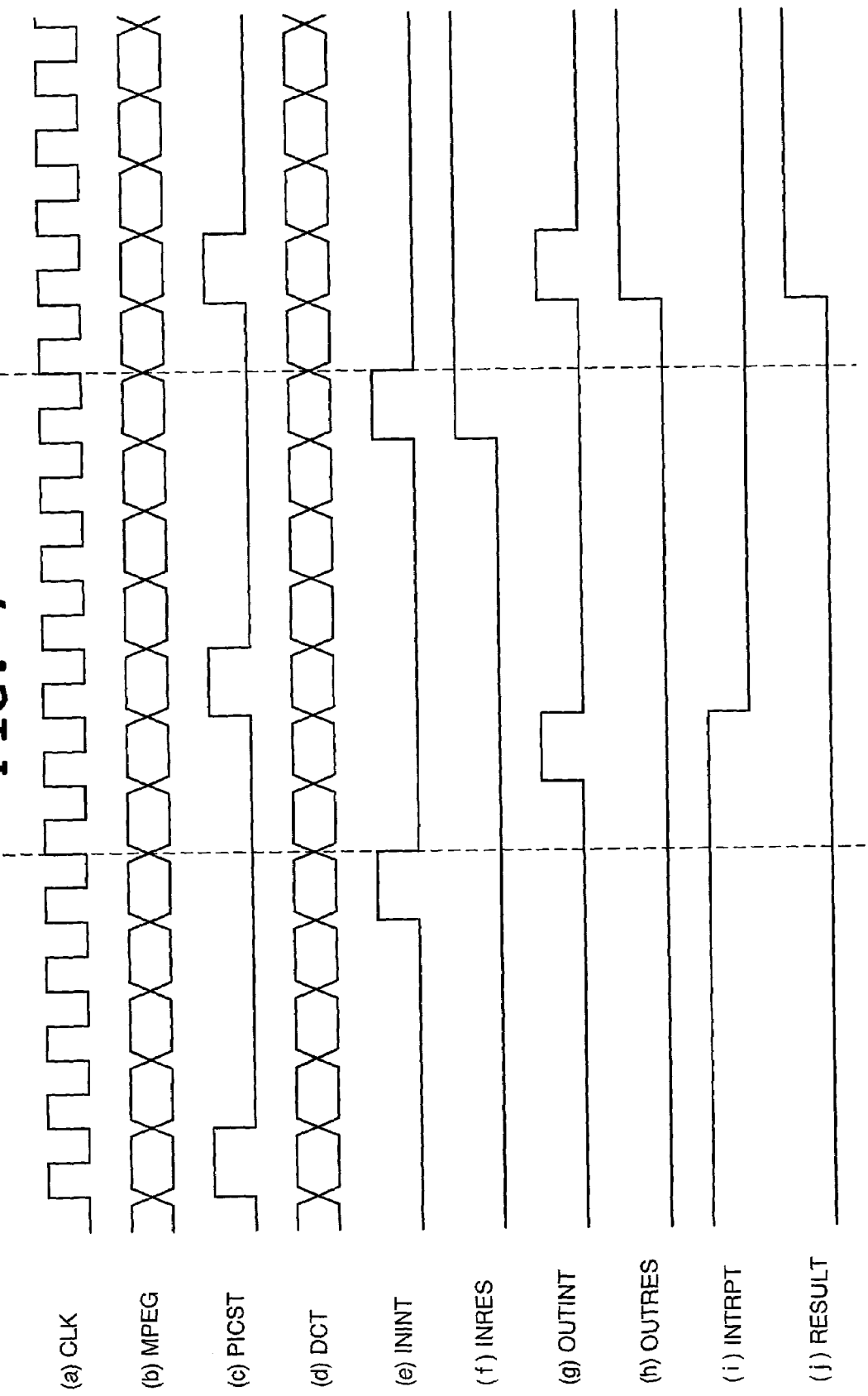
FIG. 7 is a timing chart showing operation of the electronic watermark detection device according to one embodiment of the present invention.
Figure 8:
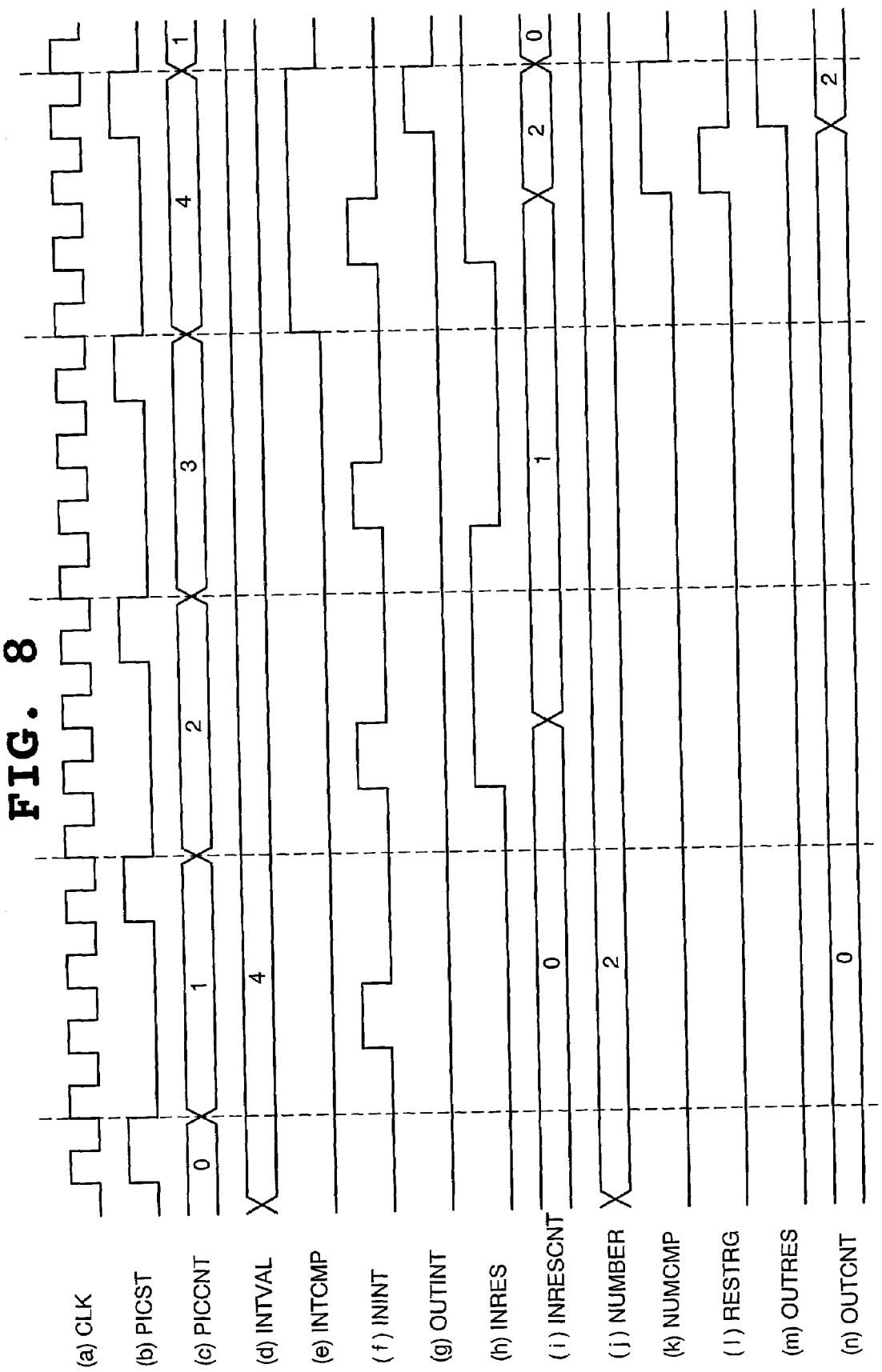
FIG. 8 is a timing chart showing operation of the detection result adjustment unit illustrated in FIG. 4.
Figure 9:
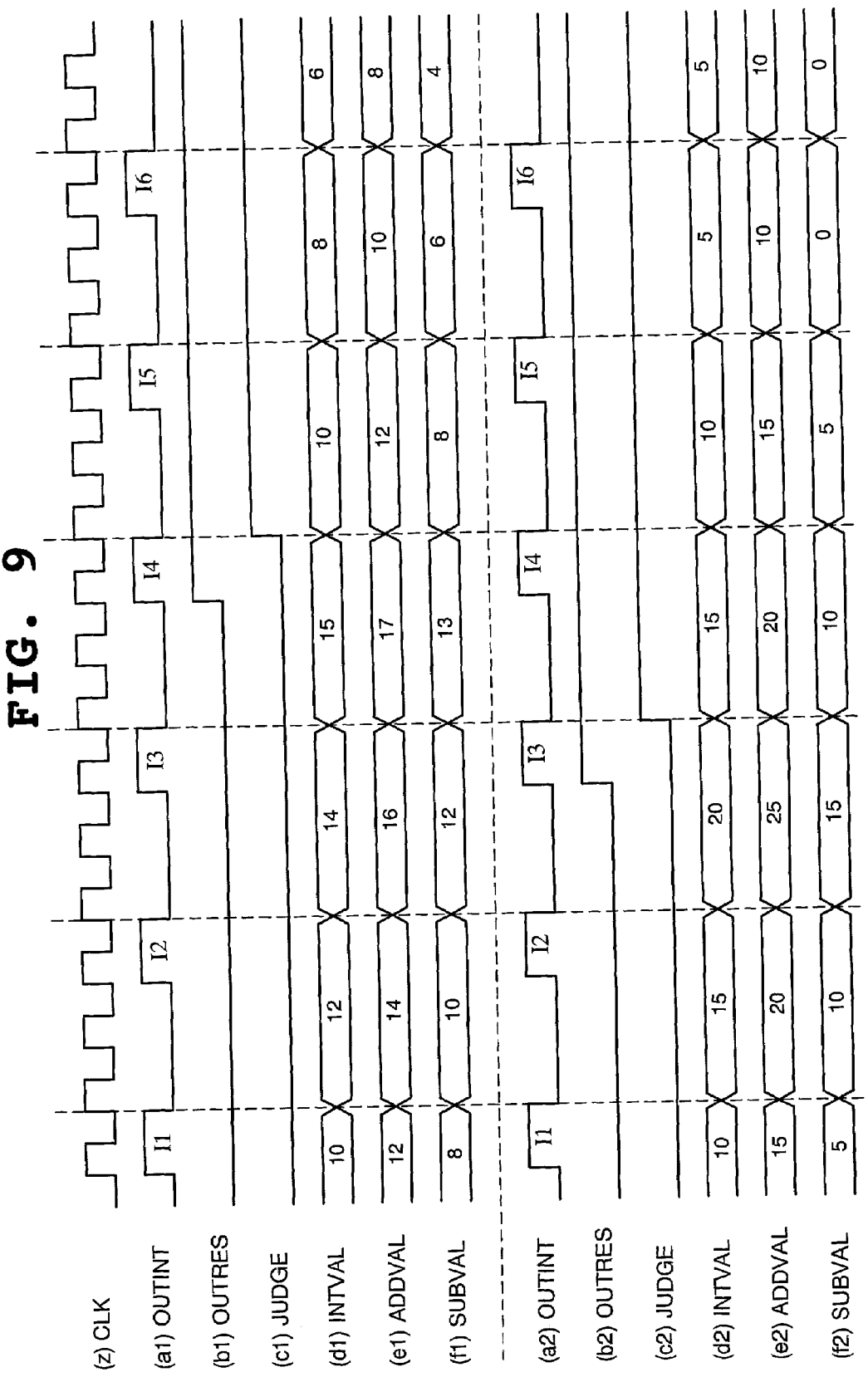
FIG. 9 is a timing chart showing operation of the detection result interval adjustment unit illustrated in FIG. 5.

FIG. 7 is a timing chart showing operation of the electronic watermark detection device according to one embodiment of the present invention, FIG. 8 is a timing chart showing operation of the detection result adjustment unit 4 illustrated in FIG. 4, and FIG. 9 is a timing chart showing operation of the detection result interval adjustment unit 46 illustrated in FIG. 5. With reference to FIGS. 1 through 9, description will be made of operation of the electronic watermark detection device according to one embodiment of the present invention.

In the electronic watermark detection device according to one embodiment of the present invention, an internal circuit is a synchronization circuit operative with an externally supplied rectangular waveform having a fixed frequency as a clock. In FIG. 7, FIG. 7(a) CLK represents a clock to be supplied and FIG. 7(b) MPEG represents a data waveform of an MEPG stream (stream). Although actual MPEG data has such a hierarchical structure as shown in FIG. 2, illustration of a structure of real data is omitted here.

FIG. 7(c) PICST represents a signal of a picture start generated at the preprocessing unit 1, which is an active-high one-clock pulse signal. Although for explanation's sake, FIG. 7(c) PICST is illustrated to attain the active state in six to seven clocks, it actually takes a longer period of time. FIG. 7(d) DCT represents a signal of a DCT coefficient generated at the preprocessing unit 1. Also with respect to the DCT, illustration of a structure of its real data is omitted.

FIG. 7(e) ININT represents a signal of a detector interruption generated at the electronic watermark detection unit 2, which is an active-high one-clock pulse signal. Although for explanation's sake, FIG. 7(e) ININT is illustrated to attain the active state in four clocks, it actually takes a longer period of time. FIG. 7(f) INRES represents a signal of a detector result generated at the electronic watermark detection unit 2, which is a signal that attains the active-high state at the detection.

FIG. 7(g) OUTINT represents an adjusted detection interruption generated from a detector interruption at the detection result adjustment unit 4, which is an active-high one-clock pulse signal. FIG. 7(h) OUTRES represents an adjusted detection result generated from a detector result at the detection result adjustment unit 4, which is a signal attaining the active-high state at the detection. FIG. 7(i) INTRPT represents an interruption generated from an adjusted detection interruption at the interruption processing unit 3, which is an active-low signal for notifying the outside of the unit of an interruption that returns to a high level or logical high when externally cleared.

FIG. 7(j) RESULT represents a detection result generated from an adjusted detection result at the interruption processing unit 3, which is an active-high signal for notifying the outside of the unit of an interruption. It is clear that even when logic for making the signal be active is inverted, no problem occurs in operation.

The preprocessing unit 1 generates a DCT coefficient and a picture start based on an externally applied MPEG stream. The electronic watermark detection unit 2 detects an electronic watermark from the picture start and the DCT coefficient to output a detector result and a detector interruption.

After the FIG. 7(*c*) PICST attains the high level, when FIG. 7(*d*) DCT is operated to end the operation processing, FIG. 7(*e*) ININT is brought to the high level and at the same time, detection or non-detection is output as FIG. 7(*f*) INRES.

This example shows that at the end of first operation [FIG. 7(*e*) ININT=high], the operation results in that FIG. 7(*f*) INRES is at a low level or logical low, that is, results in non-detection and at the end of the second operation, the operation results in that FIG. 7(*f*) INRES is at the high level, that is, results in detection. Although four clocks are spent from when FIG. 7(*c*) PICST attains the high level until FIG. 7(*e*) ININT attains the high level for explanation's sake here, it actually takes a longer period of time.

In addition, although a picture start is generated for each of an I picture, a P picture and a B picture, the electronic watermark detection unit 2 can selectively process them. In this case, detection is possible using only an I picture. At this time, FIG. 7(*c*) PICST represents a picture start as of an I picture.

The detection result adjustment unit 4 adjusts an interval of an interruption based on a detector interruption and a detector result and after accumulating the results, outputs an adjusted detection result and an adjusted detection interruption. In the present embodiment, a detection interval set value is assumed to be "1" (setting which makes the detection interval value be "1" all the time, that is, the initial interval value is "1" and the interval method is to selectively output an initial interval value of the selector 46*j*) and the set value of the number of detections is assumed to be "1". In this case, the detector interruption and the detector result are output as an adjusted detection interruption and an adjusted detection result substantially as they are.

In FIG. 7, FIG. 7(*g*) OUTINT is generated with a delay of two clocks from FIG. 7(*e*) ININT and FIG. 7(*h*) OUTRES is generated with a delay of two clocks from FIG. 7(*f*) INRES. Operation in a case where the detection interval set value and the set value of the number of detections are set to be other values than "1" will be described later.

The interruption processing unit 3 generates a detection result and an interruption to be externally output from an adjusted detection result and an adjusted detection interruption. After FIG. 7(*g*) OUTINT attains the high level, FIG. 7(*i*) INTRPT attains the low level, that is, attains the active state. In addition, the FIG. 7(*h*) OUTRES attains the high level and at the same time FIG. 7(*j*) RESULT attains the high level to indicate a detection result. Although the two signals are set to change simultaneously, they may be held at a flip-flop and output with a delay of one clock.

Similarly to the above, FIG. 8(*a*) CLK represents an externally applied clock. FIG. 8(*b*) PICST represents a signal of a picture start similarly to the above-described FIG. 7(*c*) PICST. FIG. 8(*c*) PICCNT represents an output of a counter (picture counter 43) which counts up every time FIG. 8(*b*) PICST enters the active state. FIG. 8(*d*) INTVAL represents that the detection interval set value is "4" (setting which makes the detection interval value be "4" all the time, that is, the initial interval value is "4" and the interval method is to select the selector 46*j* shown in FIG. 5 to output the initial interval value).

FIG. 8(*e*) INTCMP represents a result of comparison by the comparator 44 (when in coincidence; yes). FIG. 8(*f*) ININT is a detector interruption signal generated at the electronic watermark detection unit 2 similarly to the above-described FIG. 7(*e*) ININT. FIG. 8(*g*) OUTINT is an output of the timing generation unit 45, which represents an adjusted interruption similarly to the above-described FIG. 7(*g*) OUTINT.

FIG. 8(*h*) INRES represents a detector result generated at the electronic watermark detection unit 2 similarly to the above FIG. 7(*f*) INRES. FIG. 8(*i*) INRESCNT represents an output of FIG. 8(*h*) INRES [counter (detection result counter 41) for counting up every time FIG. 8(*f*) ININT enters the active state when at the active state]. FIG. 8(*j*) NUMBER represents a number of a set value of the number of detections (here, the number is set to be "2").

FIG. 8(*k*) NUMCMP represents a result of comparison by the comparator 42 (when in coincidence; yes). FIG. 8(*l*) RESTRG represents a timing signal from the timing generation unit 45 to the result holding unit 47. FIG. 8(*m*) OUTRES represents an adjusted detection result obtained by the detection result adjustment unit 4 similarly to FIG. 7(*h*) OUTRES.

The picture counter 43 is a counter which counts up every time a picture start enters the active state and as shown in FIG. 8(*c*) PICCNT, it counts up every time FIG. 8(*b*) PICST attains the high level. When an adjusted interruption enters the active state, the counter is simultaneously cleared to return to "0". In this example, the counter happens to coincide with the active state of FIG. 8(*b*) PICST, the counter is returned to "1" at the subsequent clock.

The comparator 44 attains the high level when the output of the picture counter 43 and the detection interval value coincide with each other. FIG. 8(*e*) INTCMP attains the high level in a period when FIG. 8(*c*) PICCNT and FIG. 8(*d*) INTVAL coincide with each other (in this example, in a period when both attain "4").

The timing generation unit 45 generates an adjusted interruption with a detector interruption in a period when the comparator 44 indicates "coincidence" as a trigger. FIG. 8(*g*) OUTINT attains the high level at a clock following a clock subsequent to a clock at a time point when FIG. 8(*f*) ININT attains the high level during the period when FIG. 8(*e*) INTCMP is at the high level. Here, the timing is delayed by two clocks for the adjustment with the timing of the adjusted detection result. Depending on a device into which the unit is incorporated, there is a case where no problem is caused even when the adjusted interruption is output one clock earlier and in this case, the timing generation unit 45 only needs to take a logical sum of the comparator 44 and the detector interruption.

The detection result counter 41 counts up every time the detector interruption enters the active state when the detector result is active. The counter is cleared to return to "0" at the same time as the time when the adjusted interruption enters the active state. FIG. 8(*i*) INRESCNT counts up every time FIG. 8(*f*) ININT attains the high level when FIG. 8(*h*) INRES is at the high level.

The comparator 42 compares the detection result counter 41 and the set value of the number of detections and when the output of the detection result counter 41 is not less than the set value of the number of detections, attains the high level and when FIG. 8(*g*) OUTINT enters the active state, it is cleared to return to "0". FIG. 8(*k*) NUMCMP attains the high level in a period when FIG. 8(*i*) INRECNT and FIG. 8(*j*) NUMBER coincide with each other. FIG. 8(*l*) RESTRG is a timing signal obtained by delaying a time point when FIG. 8(*f*) ININT attains the high level during a period when FIG. 8(*e*) INTCMP is at the high level by one clock.

The result holding unit 47 holds the result of the comparator 42 according to a trigger from the timing generation unit 45. FIG. 8(*m*) OUTRES represents a result obtained by holding FIG. 8(*k*) NUMCMP during a period when FIG. 8(*l*) RESTRG is at the high level. FIG. 8(*n*) OUTCNT represents a result obtained by holding FIG. 8(*i*) INRESCNT during a period when FIG. 8(*l*) RESTRG is at the high level.

In FIG. 9, FIG. 9(*z*) CLK represents an externally applied clock similarly to the above. FIG. 9(*a*1) OUTINT and FIG. 9(*a*2) OUTINT are an output of the timing generation unit 45, which represent an adjusted interruption, that is, an adjusted interruption to be applied to the detection result interval adjustment unit 46.

FIG. 9(*b*1) OUTRES and FIG. 9(*b*2) OUTRES are an output of the result holder 47, which represent an adjusted detection result, that is, a signal indicative of "detection" or "non-detection" of the adjusted detection results applied to the detection result interval adjustment unit 46.

FIG. 9(*c*1) JUDGE and FIG. 9(*c*2) JUDGE represent an output of the determination unit 46*e*. FIG. 9(*d*1) INTVAL and FIG. 9(*d*2) INTVAL are an output of the detection result interval adjustment unit 46, which represent a detection interval value, that is, a detection interval value which is output from the detection result interval adjustment unit 46, as well as being applied to the adder 46*a* and the subtractor 46*c*.

FIG. 9(*e*1) ADDVAL and FIG. 9(*e*2) ADDVAL represent an output of the adder 46*a*. FIG. 9(*f*1) SUBVAL and FIG. 9(*f*2) SUBVAL represent an output of the subtractor 46*c*. For explanation's sake, FIG. 9 is divided into FIGS. 9(*a*1)-(*f*1) (hereinafter, referred to as Group 1) and FIGS. 9(*a*2)-(*f*2) (hereinafter referred to as Group 2) which groups represent states different in time from each other.

In the setting of Group 1, the initial interval value=10, the maximum value=15, the addition/subtraction value=2, the minimum value=5 and the subtraction method=initial interval value (set to be 1) are selected and the interval method selects the holder 46*i*. In the setting of Group 2, the initial interval value=10, the maximum value=30, the addition/subtraction value=5, the minimum value=5 and the subtraction method=limiter 46*d* are selected and the interval method selects the holder 46*i*.

In Group 1, FIG. 9(*a*1) OUTINT attains the high level at constant intervals. Although for explanation's sake here, it attains the high level at every three clocks, it actually takes a longer period of time. FIG. 9(b1) OUTRES changes at the timing attendant on FIG. 9(a1) OUTINT. FIG. 9(*c*1) JUDGE changes at the timing attendant on FIG. 9(*a*1) OUTINT and FIG. 9(*b*1) OUTRES.

FIG. 9(*e*1) ADDVAL will be a result obtained by adding the addition/subtraction value (=2) to FIG. 9(*d*1) INTVAL and FIG. 9(*f*1) SUBVAL will be a result obtained by subtracting the addition/subtraction value (=2) from FIG. 9(*d*1) INTVAL. FIG. 9(*d*1) INTVAL has its subsequent value determined by the result of FIG. 9(*b*1) OUTRES and FIG. 9(*c*1) JUDGE every time FIG. 9(*a*1) OUTINT attains the high level.

First, since at the time (I1) when FIG. 9(*a*1) OUTINT attains the high level for the first time, FIG. 9(*b*1) OUTRES is at the low level, that is, it indicates "non-detection", the selector 46*h* selects the output of the limiter 46*b* and because the result of the adder 46*a* fails to reach the maximum value, FIG. 9(*d*1) INTVAL attains the value of FIG. 9(*e*1) ADDVAL at the subsequent clock, so that the interval is increased and held by the holder 46*i*, resulting in that the selector 46*j* selects the output of the holder 46*i* as the detection interval value.

Next, since also at the time (I2) when FIG. 9(*a*1) OUTINT attains the high level for the second time, FIG. 9(*b*1) OUTRES is at the low level, that is, it indicates "non-detection", FIG. 9(*d*1) INTVAL attains the value of FIG. 9(*e*1) ADDVAL at the subsequent clock, so that the interval is increased and held by the holder 46*i*, resulting in that the selector 46*h* selects the output of the holder 46*i* as the detection interval value.

Furthermore, although also at the time (I3) when FIG. 9(*a*1) OUTINT attains the high level for the third time, FIG. 9(*b*1) OUTRES is at the low level, that is, it indicates "non-detection", the selector 46*h* selects the output of the limiter 46*b*. However, because the maximum value is set to be 15, the value of FIG. 9(*e*1) ADDVAL exceeds the maximum value, so that the value is limited by the limiter 46*b* and FIG. 9(*d*1) INTVAL attains the maximum value of 15 at the subsequent clock, and the interval is increased to the maximum and held by the holder 46*i*, resulting in that the selector 46*j* selects the output of the holder 46*i* as the detection interval value.

Moreover, since at the time (I4) when FIG. 9(*a*1) OUTINT attains the high level for the fourth time, FIG. 9(*b*1) OUTRES is at the high level, that is, it indicates "detection", FIG. 9(*c*1) JUDGE changes from being at the low level to the high level at the subsequent clock, so that the selector 46*h* selects the output of the selector 46*g* and because the subtraction method=the initial interval value is selected and FIG. 9(*c*1) JUDGE is at the low level, the coupler 46*f* takes a logical sum of the subtraction method =1 and a logical inversion value (=1) obtained when FIG. 9(*c*1) JUDGE is at the low level signal to output the high level signal, the selector 46*g* selects the initial interval value, FIG. 9(*d*1) INTVAL attains the initial interval value of 10 at the subsequent clock and the interval is returned to the initial value and held by the holder 46*i*, whereby the selector 46*j* selects the output of the holder 46*i* as the detection interval value.

On the other hand, since also at the time (I5) when FIG. 9(*a*1) OUTINT attains the high level for the fifth time, FIG. 9(*b*1) OUTRES is at the high level, that is, it indicates "detection", the selector 46*h* selects the output of the selector 46*g* and because FIG. 9(*c*1) JUDGE is at the high level, the coupler 46*f* takes a logical sum of the subtraction method=1 and the logical inversion value (=0) obtained when FIG. 9(*c*1) JUDGE is at the high level to output the low level signal, FIG. 9(*d*1) INTVAL attains the value of FIG. 9(*f*1) SUBVAL at the subsequent clock, and the interval is decreased and held by the holder 46*i*, whereby the selector 46*j* selects the output of the holder 46*i* as the detection interval value.

In addition, since at the time (I6) when FIG. 9(*a*1) OUTINT attains the high level for the sixth time, FIG. 9(*b*1) OUTRES is at the high level, that is, it indicates "detection", the selector 46*h* selects the output of the selector 46*g* and because FIG. 9(*c*1) JUDGE is at the high level, the coupler 46*f* outputs the low level and FIG. 9(*d*1) INTVAL attains the value of FIG. 9(*f*1) SUBVAL at the subsequent clock, so that the interval is decreased and held by the holder 46*i*, resulting in that the selector 46*j* selects the output of the holder 46*i* as the detection interval value.

In Group 2, FIG. 9(*a*2) OUTINT attains the high level at constant intervals. Although for explanation's sake here, the signal attains the high level at every three clocks, it actually takes a longer period of time. FIG. 9(*b*2) OUTRES changes at the timing attendant on FIG. 9(*a*2) OUTINT. FIG. 9(*c*2) JUDGE changes at the timing attendant on FIG. 9(*a*2) OUTINT and FIG. 9(*b*2) OUTRES.

FIG. 9(e2) ADDVAL will be a result obtained by adding the addition/subtraction value (=5) to FIG. 9(d2) INTVAL and FIG. 9(f2) SUBVAL will be a result obtained by subtracting the addition/subtraction value (=5) from FIG. 9(d2) INTVAL. Every time FIG. 9(a2) OUTINT attains the high level, FIG. 9(d2) INTVAL has its subsequent value determined by the result of FIG. 9(b2) OUTRES.

First, since at the time (I1) when FIG. 9(a1) OUTINT attains the high level for the first time, FIG. 9(b1) OUTRES is at the low level, that is, it indicates "non-detection", the selector 46h selects the output of the limiter 46b and because the result of the adder 46a fails to reach the maximum value, FIG. 9(d2) INTVAL attains the value of FIG. 9(e2) ADDVAL at the subsequent clock and the interval is increased and held by the holder 46i, whereby the selector 46j selects the output of the holder 46i is selected as the detection interval value.

Next, since also at the time (I2) when FIG. 9(a2) OUTINT attains the high level for the second time, FIG. 9(b2) OUTRES is at the low level, that is, it indicates "non-detection", FIG. 9(d2) INTVAL attains the value of FIG. 9(e2) ADDVAL at the subsequent clock and the interval is increased and held by the holder 46i, whereby the selector 46j selects the output of the holder 46i as the detection interval value.

Moreover, since at the time (I3) when FIG. 9(a2) OUTINT attains the high level for the third time, FIG. 9(b2) OUTRES is at the high level, that is, it indicates "detection", the selector 46h selects the output of the selector 46g and because the subtraction method=limiter 46d is selected, the coupler 46f outputs the low level irrespective of the output of the determination unit 46e, the selector 46g selects the output of the limiter 46d and FIG. 9(d2) INTVAL attains the value of FIG. 9(f2) SUBVAL, so that the interval is decreased and held by the holder 46i, resulting in that the output of the holder 46i is selected as the detection interval value by the selector 46j.

Furthermore, since also at the time (I4) when FIG. 9(a2) OUTINT attains the high level for the fourth time, FIG. 9(b2) OUTRES is at the high level, that is, it indicates "detection", the selector 46h selects the output of the selector 46g and because the subtraction method=limiter 46d is selected, FIG. 9(d2) INTVAL attains the value of FIG. 9(f2) SUBVAL, so that the interval is decreased and held by the holder 46i, resulting in the output of the holder 46i is selected as the detection interval value by the selector 46j.

The same also occurs at the time (I5) when FIG. 9(a2) OUTINT attains the high level for the fifth time as that occurs at the time (I4) when the signal attains the high level for the fourth time. In addition, since also at the time (I6) when FIG. 9(a2) OUTINT attains the high level for the sixth time, FIG. 9(b2) OUTRES is at the high level, that is, it indicates "detection", the selector 46h selects the output of the selector 46g and because the subtraction method=limiter 46d is selected, the result of the limiter 46d is output. However, since the result of the subtractor 46c is smaller than the minimum value of 5, the value is limited by the limiter 46d, so that FIG. 9(d2) INTVAL attains the minimum value of 5 and the interval is set to be the minimum and held by the holder 46i, resulting in that the selector 46j selects the output of the holder 46i as the detection interval value.

By thus increasing a detection interval so as to make detection easier when no watermark is detected, a load on a system is reduced and by decreasing a detection interval when a watermark is detected, delays in control response of the system is prevented. In addition, even when a detection interval is increased, counting the number of detections makes it possible to know how many could have been detected and determine effectiveness of detection.

The operation control unit 7 receives a detection result with an interruption (active-low level interruption) from the watermark detection unit 6 as a trigger. Reception and transmission of a detection result signal may be realized by reading by a general-purpose input/output through a register.

With a means for adjusting a detection interval at the time of detecting data into which an electronic watermark is inserted, adjustment of a detection interval at the time of detecting an electronic watermark enables reduction in a load on a system, thereby preventing delays in system control response to the detection of an electronic watermark.

Figure 10:
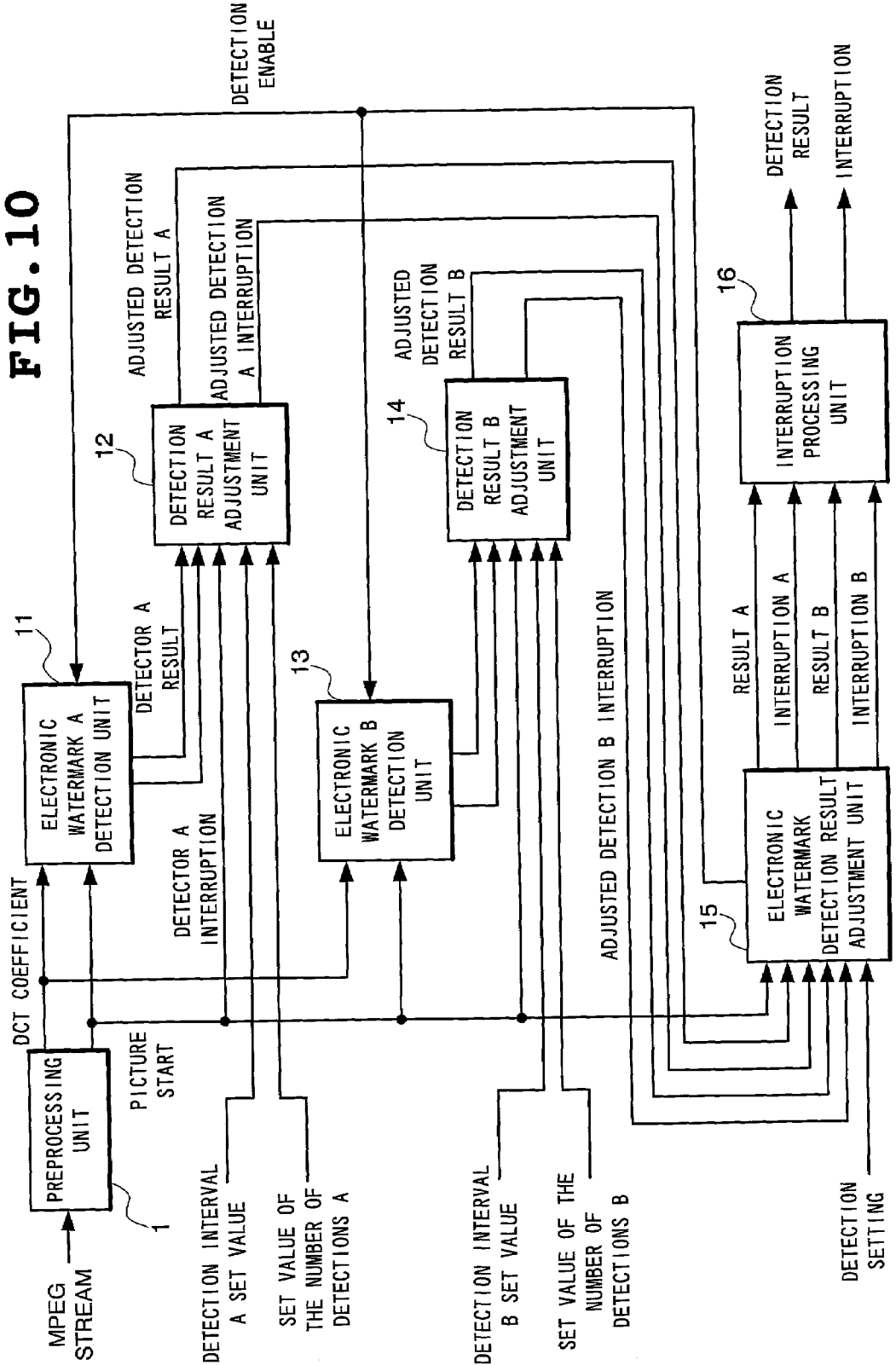
FIG. 10 is a block diagram showing a structure of an electronic watermark detection device according to another embodiment of the present invention.

FIG. 10 is a block diagram showing a structure of an electronic watermark detection device according to another embodiment of the present invention. Illustrated in FIG. 10 is an applied example using the electronic watermark detection result adjustment circuit of the present invention.

In FIG. 10, the electronic watermark detection device according to the present embodiment of the present invention includes the preprocessing unit 1, an electronic watermark A detection unit 11, a detection result A adjustment unit 12, an electronic watermark B detection unit 13, a detection result B adjustment unit 14, an electronic watermark detection result adjustment unit 15 and an interruption processing unit 16.

The electronic watermark A detection unit 11 and the electronic watermark B detection unit 13 receive input of a DCT coefficient and a picture start from the preprocessing unit 1 to detect an electronic watermark inserted into image data.

The detection result A adjustment unit 12 receives input of a picture start from the preprocessing unit 1 and input of a detector A result and a detector A interruption from the electronic watermark A detection unit 11 to count the number of pictures, as well as generating and outputting an adjusted detection result A and an adjusted detection A interruption according to the same.

The detection result B adjustment unit 14 receives input of a picture start from the preprocessing unit 1 and input of a detector B result and a detector B interruption from the electronic watermark B detection unit 13 to count the number of pictures, as well as generating and outputting an adjusted detection result B and an adjusted detection B interruption according to the same. The detection result A adjustment unit 12 and the detection result B adjustment unit 14 conduct operation equivalent to that of the detection result adjustment unit 4 shown in FIG. 1.

The electronic watermark detection result adjustment unit 15 receives input of a picture start from the preprocessing unit 1, input of the adjusted detection result A and the adjusted detection A interruption from the detection result A adjustment unit 12, input of the adjusted detection result B and the adjusted detection B interruption from the detection result B adjustment unit 14 and externally applied detection setting.

Taking a picture start into consideration based on the detection setting, output a detection enable signal to the electronic watermark A detection unit 11 and the electronic watermark B detection unit 13. This is to set which of two kinds of electronic watermarks is to be detected. It is possible, for example, to arrange such that neither the electronic watermark A detection unit 11 nor the electronic watermark B detection unit 13 operates when a two-bit detection enable signal is "00", only the electronic watermark A detection unit 11 operates when the signal is "01", and only the electronic watermark B detection unit 13 operates when the signal is "10", and depending on the detection setting, the electronic watermark A detection unit 11 and the electronic watermark B detection unit 13 may operate alternately.

As an example, immediately after activation, the detection enable signal is set to be "01" to operate the electronic watermark A detection unit 11, when the adjusted detection A interruption enters the active state (high), the detection enable signal is subsequently set to be "10" to operate the electronic watermark B detection unit 13, when the adjusted detection B interruption enters the active state (high), the detection enable is again set to be "01" to operate the electronic watermark A detection unit 11 and thereafter, the foregoing procedure will be repeated.

In addition, when the adjusted detection A interruption enters the active state (high), the electronic watermark detection result adjustment unit 15 holds the interruption at a flip-flop not shown to bring the interruption A to the active state (high) and output the active interruption A, as well as holding the adjustment detection result A at a flip-flop to output the same as a result A.

Similarly, when the adjusted detection B interruption enters the active state (high), the electronic watermark detection result adjustment unit 15 holds the interruption to bring the interruption B to the active state (high) and output the active interruption, as well as holding the adjusted detection result B at a flip-flop to output the same as a result B.

The interruption processing unit 16 receives input of the result A, the interruption A and the result B and the interruption B from the electronic watermark detection result adjustment unit 15 and when the interruption A or the interruption B enters the active state (high), generates and outputs an interruption signal according to the system (trigger signal according to a level), as well as outputting the detection results (result A and result B). The detection result to be output may be read by a register through a general-purpose interface as described above.

Thus, also at the detection of two kinds of electronic watermarks, a detection interval is increased to enable reduction in a load on a system when a watermark is detected and the same is decreased to prevent delays in system control response when no watermark is detected.

Figure 11:
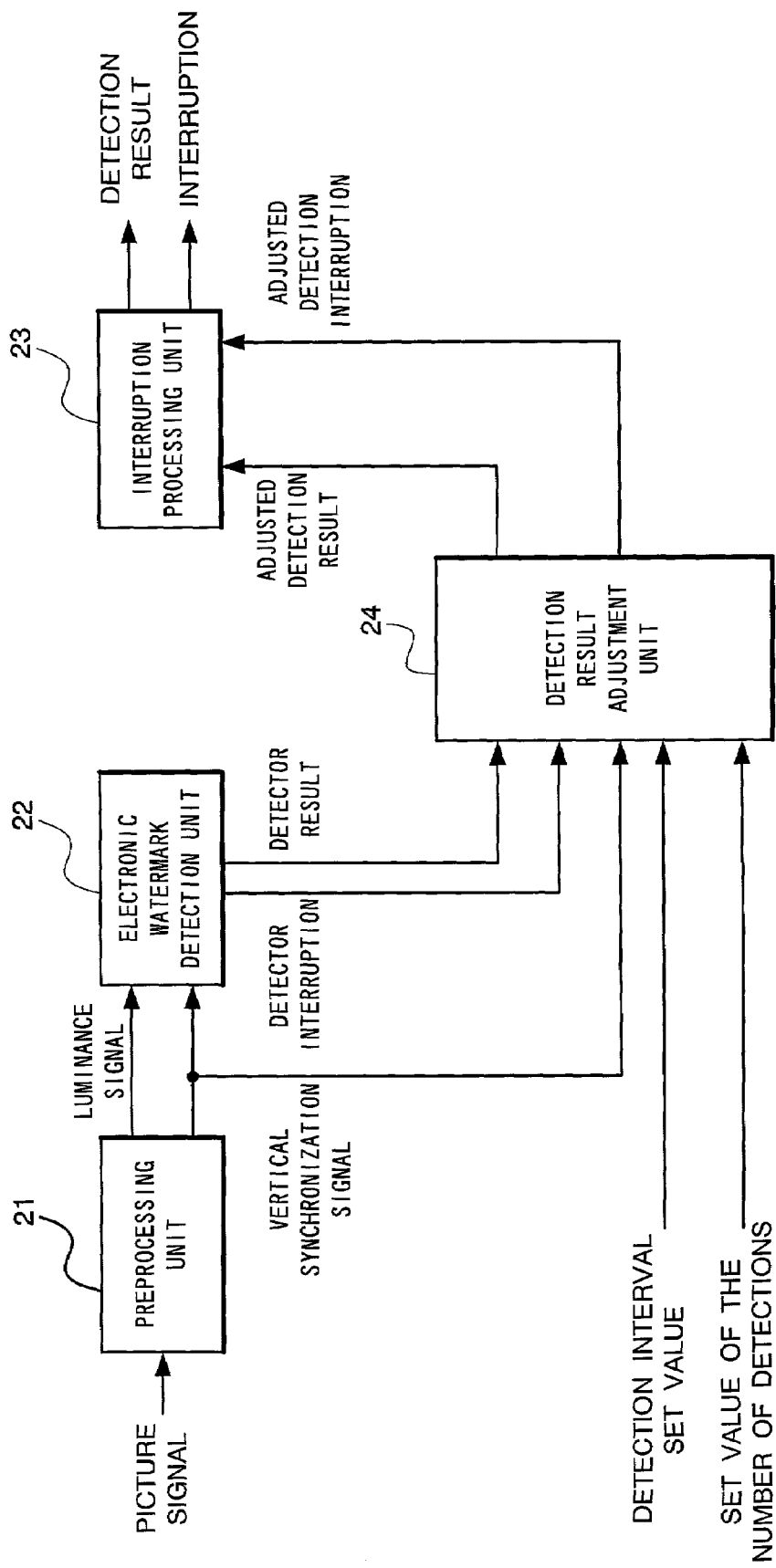
FIG. 11 is a block diagram showing a structure of an electronic watermark detection device according to a further embodiment of the present invention.
Figure 12:
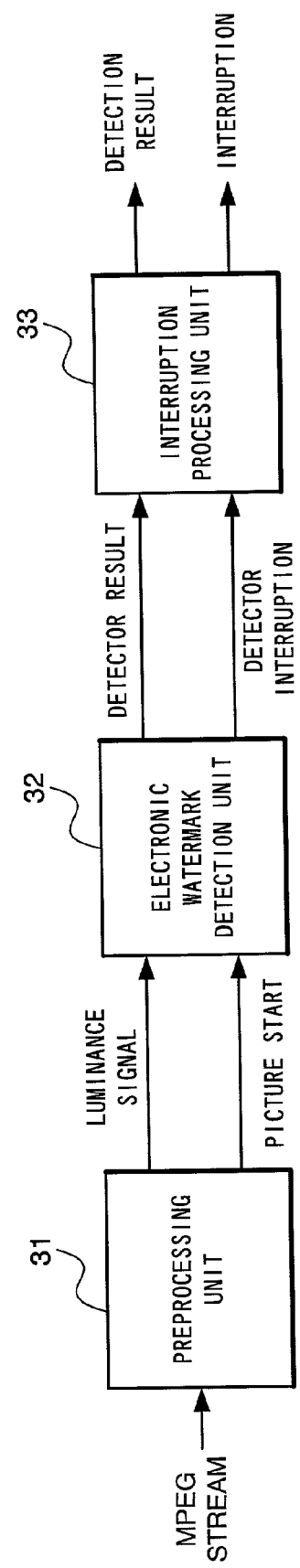
FIG. 12 is a block diagram showing a structure of a conventional electronic watermark detection device.

FIG. 11 is a block diagram showing a structure of an electronic watermark detection device according to a further embodiment of the present invention. FIG. 11 illustrates another applied example using the electronic watermark detection result adjustment circuit of the present invention. More specifically, in the electronic watermark detection device according to the present embodiment of the present invention, a frequency region of the MPEG and the like is not targeted but picture in a space region of a composite and the like is targeted.

Upon receiving input of a picture signal, a preprocessing unit 21 separates a luminance signal and a color-difference signal to extract and output a vertical synchronization signal. An electronic watermark detection unit 22 receives input of the luminance signal and the vertical synchronization signal from the preprocessing unit 21 to detect an electronic watermark inserted into image data.

A detection result adjustment unit 24 receives input of the vertical synchronization signal from the preprocessing unit 21 and input of a detector result and a detector interruption from the electronic watermark detection unit 22 to count vertical synchronization signals, as well as generating and outputting a detection interruption according to the detection result. An interruption processing unit 23 receives input of the detection result and the detection interruption from the detection result adjustment unit 24 to generate an interruption signal according to the system, as well as outputting the detection result.

In the present embodiment of the present invention, similarly to another embodiment of the present invention shown in FIG. 10, for the detection of two kinds of electronic watermarks, two detection result adjustment units 24 should be prepared to include an electronic watermark detection result adjustment unit.

As described in the foregoing, according to the present invention, in an electronic watermark detection device including an electronic watermark detection means for detecting an electronic watermark which is inserted into an image signal and indicative of at least copyright information, adjustment of an electronic watermark detection interval based on a detection result of the electronic watermark detection means enables reduction in a load on the system without delays in system control response at the detection of an electronic watermark.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An electronic watermark detection device having an electronic watermark detection means for detecting an electronic watermark inserted into an image signal and indicative of at least copyright information, comprising:
    detection result adjustment means for adjusting a detection interval of said electronic watermark based on a detection result of said electronic watermark detection means.

2. The electronic watermark detection device as set forth in claim 1, wherein
    said electronic watermark detection means generates a detection result of said electronic watermark and a detection interruption for notifying the result, and
    said detection result adjustment means accumulates the detection results of said electronic watermark based on said detection result and said detection interruption from said electronic watermark detection means and adjusts said electronic watermark detection interval based on the accumulation result.

3. The electronic watermark detection device as set forth in claim 2, wherein
    said detection result adjustment means adjusts output timing of said detection interruption based on said detection result and said detection interruption from said electronic watermark detection means to output the adjusted timing as an adjusted detection interruption.

4. The electronic watermark detection device as set forth in claim 2, wherein
    said detection result adjustment means adjusts output timing of said detection interruption based on said detection result and said detection interruption from said electronic watermark detection means and externally instructed detection interval set value and set value of the number of detections to output the adjusted timing as an adjusted detection interruption.

5. The electronic watermark detection device as set forth in claim 2, wherein
said detection result adjustment means
adjusts output timing of said detection interruption based on said detection result and said detection interruption from said electronic watermark detection means to output the adjusted timing as an adjusted detection interruption, and
increases said detection interval when said electronic watermark is detected and decreases said detection interval when none of said electronic watermark is detected.

6. The electronic watermark detection device as set forth in claim 2, wherein
said detection result adjustment means
adjusts output timing of said detection interruption based on said detection result and said detection interruption from said electronic watermark detection means and externally instructed detection interval set value and set value of the number of detections to output the adjusted timing as an adjusted detection interruption, and
increases said detection interval when said electronic watermark is detected and decreases said detection interval when none of said electronic watermark is detected.

7. The electronic watermark detection device as set forth in claim 1, wherein
said detection result adjustment means increases said detection interval when said electronic watermark is detected and decreases said detection interval when none of said electronic watermark is detected.

8. The electronic watermark detection device as set forth in claim 1, wherein
said electronic watermark detection means generates a detection result of said electronic watermark and a detection interruption for notifying the result, and
said detection result adjustment means
accumulates the detection results of said electronic watermark based on said detection result and said detection interruption from said electronic watermark detection means and adjusts said electronic watermark detection interval based on the accumulation result, and
increases said detection interval when said electronic watermark is detected and decreases said detection interval when none of said electronic watermark is detected.

9. The electronic watermark detection device as set forth in claim 1, wherein
said image signal is a digital image including at least an image of the MEPG (Moving Picture Experts Group) standard.

10. The electronic watermark detection device as set forth in claim 1, wherein
said image signal is a picture signal of at least a space region.

11. An electronic watermark detection method of an electronic watermark detection device for detecting an electronic watermark inserted into an image signal and indicative of at least copyright information, comprising the steps of:
detecting said electronic watermark, and
adjusting a detection interval of said electronic watermark based on a detection result of said electronic watermark.

12. The electronic watermark detection method as set forth in claim 11, wherein
at said electronic watermark detection step, a detection result of said electronic watermark and a detection interruption for notifying the result are generated, and
at said detection result adjustment step, the detection results of said electronic watermark are accumulated based on said detection result and said detection interruption from said electronic watermark detection step and said electronic watermark detection interval is adjusted based on the accumulation result.

13. The electronic watermark detection method as set forth in claim 12,
wherein at said detection result adjustment step, output timing of said detection interruption is adjusted based on said detection result and said detection interruption from said electronic watermark detection step to output the adjusted timing as an adjusted detection interruption.

14. The electronic watermark detection method as set forth in claim 12, wherein
at said detection result adjustment step, output timing of said detection interruption is adjusted based on said detection result and said detection interruption from said electronic watermark detection step and externally instructed detection interval set value and set value of the number of detections to output the adjusted timing as an adjusted detection interruption.

15. The electronic watermark detection method as set forth in claim 12, wherein
at said detection result adjustment step,
output timing of said detection interruption is adjusted based on said detection result and said detection interruption from said electronic watermark detection step to output the adjusted timing as an adjusted detection interruption, and
said detection interval is increased when said electronic watermark is detected and said detection interval is decreased when none of said electronic watermark is detected.

16. The electronic watermark detection method as set forth in claim 12, wherein
at said detection result adjustment step,
output timing of said detection interruption is adjusted based on said detection result and said detection interruption from said electronic watermark detection step and externally instructed detection interval set value and set value of the number of detections to output the adjusted timing as an adjusted detection interruption, and
said detection interval is increased when said electronic watermark is detected and said detection interval is decreased when none of said electronic watermark is detected.

17. The electronic watermark detection method as set forth in claim 11, wherein
at said detection result adjustment step, said detection interval is increased when said electronic watermark is detected and said detection interval is decreased when none of said electronic watermark is detected.

18. The electronic watermark detection method as set forth in claim 11, wherein
at said electronic watermark detection step, a detection result of said electronic watermark and a detection interruption for notifying the result are generated, and
at said detection result adjustment step,
the detection results of said electronic watermark are accumulated based on said detection result and said detection interruption from said electronic watermark detection step and said electronic watermark detection interval is adjusted based on the accumulation result, and said detection interval is increased when said electronic watermark is detected and said detection interval is decreased when none of said electronic watermark is detected.

19. The electronic watermark detection method as set forth in claim 11, wherein said image signal is a digital image including at least an image of the MEPG (Moving Picture Experts Group) standard.

20. The electronic watermark detection method as set forth in claim 11, wherein said image signal is a picture signal of at least a space region.

21. An electronic watermark detection device having an electronic watermark detection unit which detects an electronic watermark inserted into an image signal and indicative of at least copyright information, comprising:

detection result adjustment unit which adjusts detection interval of said electronic watermark based on a detection result of said electronic watermark detection unit.

22. The electronic watermark detection device as set forth in claim 21, wherein said electronic watermark detection unit generates a detection result of said electronic watermark and a detection interruption for notifying the result, and said detection result adjustment unit accumulates the detection results of said electronic watermark based on said detection result and said detection interruption from said electronic watermark detection unit and adjusts said electronic watermark detection interval based on the accumulation result.

23. The electronic watermark detection device as set forth in claim 22, wherein said detection result adjustment unit adjusts output timing of said detection interruption based on said detection result and said detection interruption from said electronic watermark detection unit to output the adjusted timing as an adjusted detection interruption.

24. The electronic watermark detection device as set forth in claim 22, wherein said detection result adjustment unit adjusts output timing of said detection interruption based on said detection result and said detection interruption from said electronic watermark detection unit and externally instructed detection interval set value and set value of the number of detections to output the adjusted timing as an adjusted detection interruption.

25. The electronic watermark detection device as set forth in claim 22, wherein said detection result adjustment unit adjusts output timing of said detection interruption based on said detection result and said detection interruption from said electronic watermark detection unit to output the adjusted timing as an adjusted detection interruption, and increases said detection interval when said electronic watermark is detected and decreases said detection interval when none of said electronic watermark is detected.

26. The electronic watermark detection device as set forth in claim 22, wherein said detection result adjustment unit adjusts output timing of said detection interruption based on said detection result and said detection interruption from said electronic watermark detection unit and externally instructed detection interval set value and set value of the number of detections to output the adjusted timing as an adjusted detection interruption, and increases said detection interval when said electronic watermark is detected and decreases said detection interval when none of said electronic watermark is detected.

27. The electronic watermark detection device as set forth in claim 21, wherein said detection result adjustment unit increases said detection interval when said electronic watermark is detected and decreases said detection interval when none of said electronic watermark is detected.

28. The electronic watermark detection device as set forth in claim 21, wherein said electronic watermark detection unit generates a detection result of said electronic watermark and a detection interruption for notifying the result, and said detection result adjustment unit accumulates the detection results of said electronic watermark based on said detection result and said detection interruption from said electronic watermark detection unit and adjusts said electronic watermark detection interval based on the accumulation result, and increases said detection interval when said electronic watermark is detected and decreases said detection interval when none of said electronic watermark is detected.

29. The electronic watermark detection device as set forth in claim 21, wherein said image signal is a digital image including at least an image of the MEPG (Moving Picture Experts Group) standard.

30. The electronic watermark detection device as set forth in claim 21, wherein said image signal is a picture signal of at least a space region.

* * * * *